US011381850B2

(12) United States Patent
Fang et al.

(10) Patent No.: US 11,381,850 B2
(45) Date of Patent: *Jul. 5, 2022

(54) THERMOSTAT AND SYSTEM AND METHOD FOR USE OF SAME

(71) Applicant: Enseo, LLC, Plano, TX (US)

(72) Inventors: William C. Fang, Plano, TX (US); Raymond S. Horton, McKinney, TX (US); Thomas R. Miller, Plano, TX (US); Vanessa Ogle, Fairview, TX (US)

(73) Assignee: Enseo, LLC, Plano, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/173,957

(22) Filed: Feb. 11, 2021

(65) Prior Publication Data

US 2021/0168410 A1 Jun. 3, 2021

Related U.S. Application Data

(63) Continuation-in-part of application No. 17/103,452, filed on Nov. 24, 2020, now Pat. No. 11,284,122,
(Continued)

(51) Int. Cl.
| | |
|---|---|
| *H04N 21/214* | (2011.01) |
| *H04N 21/4363* | (2011.01) |
| *H04N 21/258* | (2011.01) |
| *H04N 21/434* | (2011.01) |
| *H04N 21/45* | (2011.01) |
| *H04N 21/414* | (2011.01) |
| *H04N 21/422* | (2011.01) |
| *H04N 21/236* | (2011.01) |

(Continued)

(52) U.S. Cl.
CPC ........ *H04N 21/2143* (2013.01); *G07C 1/00* (2013.01); *H04N 21/23605* (2013.01); *H04N 21/25841* (2013.01); *H04N 21/414* (2013.01); *H04N 21/4108* (2013.01); *H04N 21/42221* (2013.01); *H04N 21/4343* (2013.01); *H04N 21/43637* (2013.01); *H04N 21/4516* (2013.01); *H04N 21/4524* (2013.01); *H04W 84/12* (2013.01)

(58) Field of Classification Search
CPC ......... H04N 21/4516; H04N 21/43637; H04N 21/2143; H04N 21/25841; H04N 21/4343; H04N 21/4524; H04N 21/4108; H04N 21/414; H04N 21/42221; H04N 21/23605; G07C 1/00; H04W 84/12
See application file for complete search history.

(56) References Cited

U.S. PATENT DOCUMENTS

| | | | |
|---|---|---|---|
| 8,766,194 B2 | 7/2014 | Filson et al. | |
| 8,942,853 B2 | 1/2015 | Stefanski et al. | |
| 9,332,304 B2 | 5/2016 | Ogle et al. | |
| 9,344,757 B2 | 5/2016 | Ogle et al. | |
| 9,357,254 B2 | 5/2016 | Ogle et al. | |
| 9,587,848 B2 | 3/2017 | Adamik et al. | |
| 9,654,826 B2 | 5/2017 | Ogle et al. | |
| 9,654,827 B2 | 5/2017 | Ogle et al. | |
| 9,712,872 B2 | 7/2017 | Ogle et al. | |

(Continued)

*Primary Examiner* — Yassin Alata
(74) *Attorney, Agent, or Firm* — Scott Griggs; Griggs Bergen LLP

(57) ABSTRACT

A thermostat and system and method for use of the same are disclosed. In one embodiment, multiple wireless transceivers are located within a housing, which also interconnectively includes a processor and memory. To improve convenience, the thermostat may establish a pairing with a proximate wireless-enabled interactive programmable device having a display. Virtual remote control functionality for various amenities may then be provided. To improve safety, the thermostat may be incorporated into a geolocation and safety network.

20 Claims, 6 Drawing Sheets

Related U.S. Application Data which is a continuation of application No. 16/570,043, filed on Sep. 13, 2019, now Pat. No. 10,848,789, which is a continuation-in-part of application No. 16/201,783, filed on Nov. 27, 2018, now Pat. No. 10,602,196, which is a continuation of application No. 15/652,622, filed on Jul. 18, 2017, now Pat. No. 10,142,662, which is a continuation of application No. 15/165,851, filed on May 26, 2016, now Pat. No. 9,712,872, which is a continuation of application No. 14/461,479, filed on Aug. 18, 2014, now Pat. No. 9,357,254.

(60) Provisional application No. 61/935,862, filed on Feb. 5, 2014, provisional application No. 63/117,630, filed on Nov. 24, 2020, provisional application No. 62/731,822, filed on Sep. 15, 2018.

(51) Int. Cl.
*G07C 1/00* (2006.01)
*H04N 21/41* (2011.01)
*H04W 84/12* (2009.01)

(56) References Cited

U.S. PATENT DOCUMENTS

| | | |
|---|---|---|
| 9,800,932 B2 | 10/2017 | Ogle et al. |
| 9,832,490 B2 | 11/2017 | Ogle et al. |
| 9,857,090 B2 | 1/2018 | Golden et al. |
| 9,857,091 B2 | 1/2018 | Robideau et al. |
| 10,091,534 B2 | 10/2018 | Ogle et al. |
| 10,104,402 B2 | 10/2018 | Ogle et al. |
| 10,142,662 B2 | 11/2018 | Ogle et al. |
| 10,764,735 B2 | 9/2020 | Horton et al. |
| 10,767,883 B2 | 9/2020 | Malcolm et al. |
| 10,785,047 B1 | 9/2020 | Bodkin et al. |
| 10,853,733 B2 | 12/2020 | Fadell et al. |
| 2011/0099575 A1 | 4/2011 | Woo et al. |
| 2015/0156030 A1 | 6/2015 | Fadell et al. |
| 2016/0040903 A1 | 2/2016 | Emmons et al. |
| 2017/0318341 A1 | 11/2017 | Ogle et al. |
| 2018/0077459 A1 | 5/2018 | Ogle et al. |
| 2019/0037248 A1 | 1/2019 | Ogle et al. |
| 2019/0045229 A1 | 2/2019 | Ogle et al. |
| 2019/0098340 A1 | 3/2019 | Ogle et al. |
| 2020/0025402 A1 | 1/2020 | Bell et al. |
| 2020/0386437 A1 | 12/2020 | Roosli |

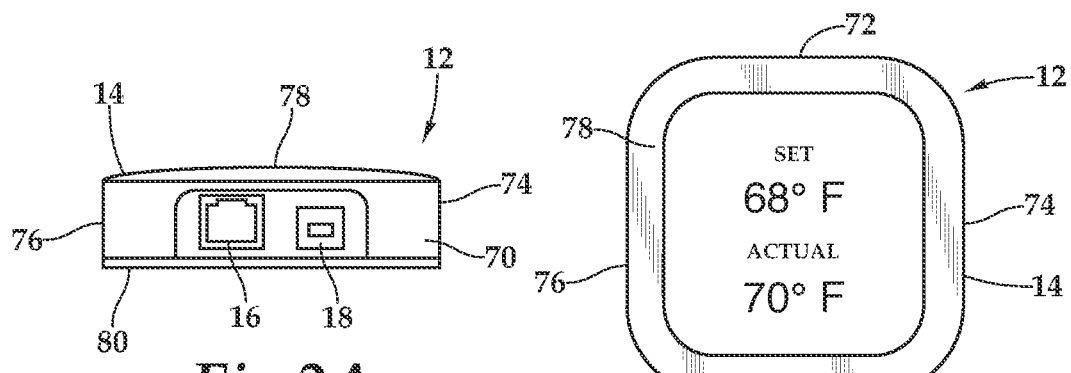
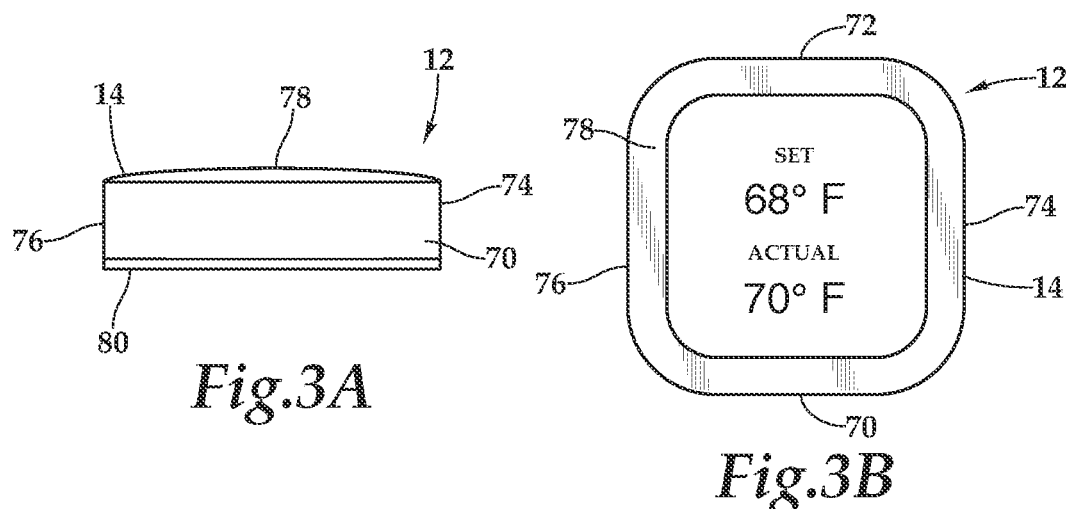
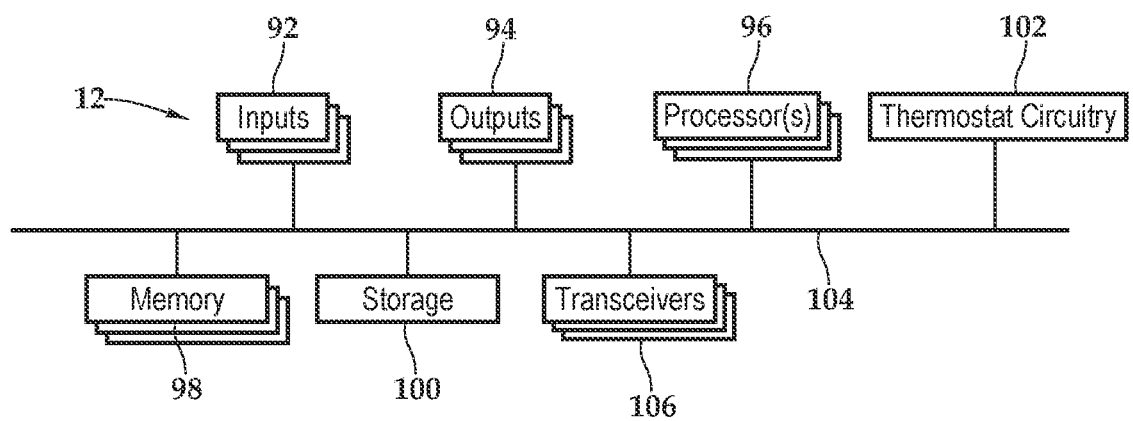

THERMOSTAT AND SYSTEM AND METHOD FOR USE OF SAME

PRIORITY STATEMENT & CROSS-REFERENCE TO RELATED APPLICATION

This application claims priority from U.S. Patent Application Ser. No. 63/117,630 entitled "Thermostat and System and Method for Use of Same" filed on Nov. 24, 2020, in the name of William C. Fang; which is hereby incorporated by reference, in entirety, for all purposes. This application is also a continuation-in-part of U.S. patent application Ser. No. 17/103,452 entitled "Gateway Device and System and Method for Use of Same" filed on Nov. 24, 2020, in the names of William C. Fang et al.; which is a continuation of U.S. patent application Ser. No. 16/570,043 entitled "Gateway Device and System and Method for Use of Same" filed on Sep. 13, 2019, in the names of William C. Fang et al, now U.S. Pat. No. 10,848,789 and issued on Nov. 24, 2020; which claims the benefit of U.S. Patent Application Ser. No. 62/731,822 entitled "Gateway Device and System and Method for Use of Same" filed on Sep. 15, 2018, in the name of William C. Fang. U.S. patent application Ser. No. 16/570,043 is also a continuation in part of Ser. No. 16/201,783 entitled "Set-Top Box, System and Method for Providing Awareness in a Hospitality Environment" filed on Nov. 27, 2018, in the names of Vanessa Ogle et al., now U.S. Pat. No. 10,602,196 issued on Mar. 24, 2020; which is a continuation of U.S. patent application Ser. No. 15/652,622 entitled "Set-Top Box, System and Method for Providing Awareness in a Hospitality Environment" filed on Jul. 18, 2017, in the names of Vanessa Ogle et al., now U.S. Pat. No. 10,142,662 issued on Nov. 27, 2018; which is a continuation of U.S. patent application Ser. No. 15/165,851 entitled "Set-Top Box, System and Method for Providing Awareness in a Hospitality Environment" filed on May 26, 2016, in the names of Vanessa Ogle et al., now U.S. Pat. No. 9,712,872 issued on Jul. 18, 2017; which is a continuation of U.S. patent application Ser. No. 14/461,479 entitled "Set-Top Box, System and Method for Providing Awareness in a Hospitality Environment" filed on Aug. 18, 2014, in the names of Vanessa Ogle et al., now U.S. Pat. No. 9,357,254 issued on May 31, 2016; which claims priority from U.S. Patent Application Ser. No. 61/935,862 entitled "System and Method for Providing Awareness in a Hospitality Environment" and filed on Feb. 5, 2014, in the name of Vanessa Ogle; all of which are hereby incorporated by reference, in entirety, for all purposes.

This application discloses subject matter related to the subject matter disclosed in the following commonly owned, U.S. patent application Ser. No. 17/173,916 entitled "Thermostat and System and Method for Use of Same" and filed on Feb. 11, 2021, in the name of William C. Fang; which claims the benefit from U.S. Provisional Patent Application No. 63/117,618, entitled "Thermostat and System and Method for Use of Same" and filed on Nov. 24, 2020 in the name of William C. Fang; both of which are hereby incorporated by reference, in entirety, for all purposes.

TECHNICAL FIELD OF THE INVENTION

This invention relates, in general, to devices and systems for monitoring and controlling heating and cooling in a room or other environment to a setpoint temperature and, in particular, to thermostats with enhanced convenience and systems and methods for use of the same that address and enhance the automation of solutions in the room or the other environment.

BACKGROUND OF THE INVENTION

Without limiting the scope of the present invention, the background will be described in relation to the hospitality lodging industry, as an example. To many individuals, a hotel room is more than just a place to sleep, rather it is part of a larger and hopefully positive, hospitality experience. Hotel guests are seeking enhanced convenience in an easy-to-use platform to make this experience a reality. As a result of such consumer preferences, hassle free connectivity and confidence inspiring control of room amenities are differentiators in determining the experience of guests staying in hospitality lodging establishments. Accordingly, there is a need for improved systems and methods for providing enhanced convenience in an easy-to-use platform in the hospitality lodging industry.

SUMMARY OF THE INVENTION

It would be advantageous to achieve a thermostat that would improve upon existing limitations in functionality. It would be desirable to enable a computer-based electronics and software solution that would provide enhanced convenience in an easy-to-use platform in the hospitality lodging industry or in another environment. Further, it would also be desirable to enable a computer-based electronics and software solution that would provide improved safety in a reliable platform. To better address one or more of these concerns, a thermostat and system and method for use of the same are disclosed. In one embodiment of the thermostat, multiple wireless transceivers are located within a housing, which also interconnectively includes a processor and memory.

The thermostat may establish a pairing with a proximate wireless-enabled interactive programmable device having a display and various amenities. Content, such as the Internet, movies, music, or games, for example, may be imported, e.g., streamed, from the programmable device and reformatted at the thermostat for rendering on one of the amenities. Virtual remote control functionality of the amenities may also be provided. To improve safety, the thermostat may be incorporated into a geolocation and safety network.

In another embodiment, a system for remote control is disclosed. A programming interface is configured to communicate with a thermostat, which includes a housing securing a temperature input, a temperature output, a processor, non-transitory memory, and storage therein with a busing architecture providing interconnectivity. The non-transitory memory is accessible to the processor and the non-transitory memory includes various processor-executable instructions that, when executed by the processor, cause the system to perform various operations, including the aforementioned pairing, virtual remote control functionality, and incorporation into a geolocation and safety network, for example. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 2A is a front elevation view of one embodiment of the thermostat depicted in FIG. 1 in further detail;

FIG. 2B is a top plan view of the thermostat depicted in FIG. 2A;

FIG. 3A is a front elevation view of another embodiment of a thermostat, according to the teachings presented herein;

FIG. 3B is a top plan view of the thermostat depicted in FIG. 3A;

FIG. 4 is a functional block diagram depicting one embodiment of the thermostat presented in FIGS. 2A and 2B;

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Figure 1:
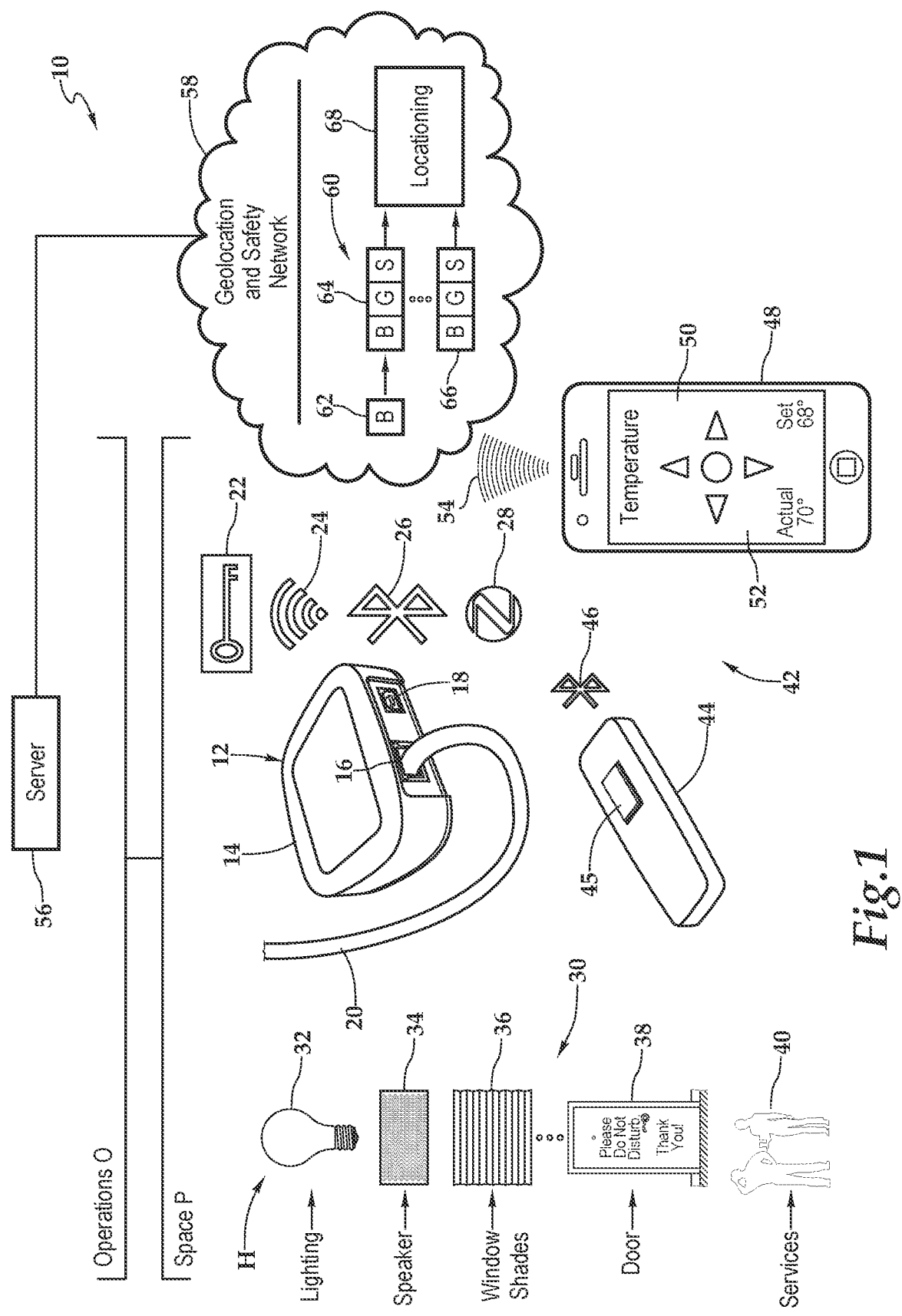
FIG. 1 is schematic diagram depicting one embodiment of a system for providing a thermostat furnishing enhanced convenience and safety functionality therewith, according to the teachings presented herein.

Referring initially to FIG. 1, therein is depicted one embodiment of a system 10 utilizing a thermostat 12 with enhanced content capabilities and safety capabilities being employed within a hospitality lodging establishment. The hospitality lodging establishment or, more generally, hospitality property, may be a furnished multi-family residence, a dormitory, a lodging establishment, a hotel, a hospital, or another multi-unit environment. As shown, by way of example and not by way of limitation, the hospitality environment is depicted as the hotel H having various rooms and spaces, including a space P and back of the house operations O. As will be discussed in additional detail, the thermostat 12 is communicatively disposed with various amenities associated with the hospitality environment or hotel H as well as a geolocation and safety network 58. Thermostats, like the thermostat 12, may be deployed throughout the spaces P and rooms of the hotel H.

As shown, in one embodiment, within the space P, which may be a hallway or lobby, for example, the system 10 includes the thermostat 12 having a housing 14 with physical connections 16, 18. A network cable 20 is secured to the physical connection 16. A configuration profile 22 provides the information and credentials necessary for the thermostat 12 to have convenient connections to amenities and a safe experience for the guests as well as workers at the hotel H through the geolocation and safety network 58, as will be described below. Multiple antennas may provide for the wireless capabilities of the thermostat 12 and include, for example, wireless standards: Wi-Fi 24, Bluetooth 26, and ZigBee 28. More generally, it should be appreciated that the cabling connected to the thermostat 12 and antenna configuration will depend on the environment and application and the cabling connections and wireless standards presented in FIG. 1 are depicted for illustrative purposes.

The thermostat 12 communicates wirelessly with various amenities 30, which are depicted as environmental and service amenities, within and for an environment of the space P. As shown, the amenities 30 may include lighting 32, a speaker 34, window shades 36, a door 38, which is depicted as a door indication for "Please Do Not Disturb," and services 40, which may include repair services, delivery services, or housekeeping services, for example. A programmable device 42, such as a single button programmable device 44 having a button 45 with Bluetooth capabilities 46 or a proximate wireless-enabled interactive programmable device 48 may be in communication with the thermostat 12 by a wireless standard. As shown, the proximate wireless-enabled interactive programmable device 48 may be a wireless-enabled interactive handheld device that may be supplied or carried by the guest and may be selected from a range of existing devices, such as, personal computers, laptops, tablet computers, smart phones, smart wearables, and smart watches, for example. In one implementation, an application installed from a server 56 enables the thermostat 12 and the proximate wireless-enabled interactive programmable device 48 to be wirelessly paired. In another embodiment, a challenge-response is utilized to wirelessly pair the thermostat 12 and the proximate wireless-enabled interactive programmable device 48.

As shown, the configuration profile 22 is loaded within the thermostat 12. The configuration profile 22 may be loaded from the operations, e.g., a front desk or hotel headend, by use of a remote control, or by a proximate device, such as the proximate wireless-enabled interactive programmable device 48. The configuration profile 22 enables, in operation, to query the status of one of the amenities 30, to furnish virtual remote control functionality of the amenities 30 that may be provided by the proximate wireless-enabled interactive programmable device 48, and to import content from the proximate wireless-enabled interactive programmable device to one of the amenities 30, such as the speaker 34. Such functionality is depicted by the proximate wireless-enabled interactive programmable device 48 having a display 50 and a virtual interface 52 thereon for controlling the temperature of the space P by way of a Wi-Fi wireless signal 54 that is received by the thermostat 12 and transmitted to the HVAC system.

In another implantation, the thermostat 12 has a data link to the server 56 which is providing the geolocation and safety network 58, which includes the thermostat 12 as well as the programmable device 42 in the form of the single button programmable device 44 or the proximate wireless-enabled interactive programmable device 48. In one implementation, an individual has the programmable device 44, which may transmit a beacon from the programmable device 44 using a wireless standard such as the Bluetooth 46 to the thermostat 12. The thermostat 12 then processes the received beacon signal and sends a broadcast signal to the server 56. More particularly, with respect to data flow 60, the programmable device 44 transmits a beacon signal 62 which includes a personal location device identification B identifying the programmable device 44. The beacon signal 62 is received by the thermostat 12 which transmits a broadcast signal 64 including the personal location device identification B, a thermostat identification G identifying the thermostat 12, and a signal characteristic indicator S, such as signal strength, for example. The server 56 receives the broadcast signal 64 and uses multiple broadcast signals, including broadcast signal 66, for locationing 68, such as triangulation, of the location of the programmable device 44. The server 56, in turn, sends out the appropriate notifications to various phones, activates alarms, or notifies others via a computer, depending on the situation. As a spatial array of horizontal and vertical thermostats are provided, the server 56 and system presented herein is able to determine the location of the individual associated with the programmable device 44 within a building. The location information determined includes which floor the individual is presently located as well as the room or common area.

Referring to FIG. 2A and FIG. 2B, the thermostat 12 may be a wall-mounted unit that is an information appliance device that generally contains convenience and safety functionality in addition to monitoring and controlling heating and cooling in a room or other environment to a setpoint temperature. The thermostat 12 includes the housing 14 having a front wall 70, rear wall 72, side wall 74, side wall 76, top wall 78, and bottom base 80. It should be appreciated that front wall, rear wall, and side wall are relative terms used for descriptive purposes and the orientation and the nomenclature of the walls may vary depending on application. The front wall 70 includes various ports, such as the physical connections 16, 18 that provide interfaces for various interfaces, including inputs (please see FIG. 4) and outputs 94 (please see FIG. 4). In one implementation, as illustrated, the port 16 is an RJ45 port and port 18 is a USB2 port. It should be appreciated that the configuration of ports may vary with the thermostat depending on application and context. By way of further example, referring to FIG. 3A and FIG. 3B, the thermostat 12 may have no additional ports.

Referring now to FIG. 4, within the housing 14, the inputs 92, the outputs 94, a processor or processors 96, memory 98, storage 100, and thermostat circuitry 102 are interconnected by a bus architecture 104 within a mounting architecture. The processor 96 may process instructions for execution within the computing device, including instructions stored in the memory 98 or in the storage 100. The memory 98 stores information within the computing device. In one implementation, the memory 98 is a volatile memory unit or units. In another implementation, the memory 98 is a non-volatile memory unit or units. Storage 100 provides capacity that is capable of providing mass storage for the thermostat 12. The various inputs 92 and outputs 94 provide connections to and from the computing device, wherein the inputs 92 are the signals or data received by the thermostat 12, and the outputs 94 are the signals or data sent from the thermostat 12.

Multiple transceivers 106 may be associated with the thermostat 12 and communicatively disposed with the bus 104. As shown the transceivers 106 may be internal, external, or a combination thereof to the housing. Further, the transceivers 106 may be a transmitter/receiver, receiver, or an antenna for example. Communication between various amenities 30 in the space P and the thermostat 12 may be enabled by a variety of wireless methodologies employed by the transceiver 106, including 802.11, 802.15, 802.15.4, 3G, 4G, Edge, Wi-Fi, ZigBee, near field communications (NFC), Bluetooth low energy and Bluetooth, for example. Also, infrared (IR) may be utilized.

The memory 98 and storage 100 are accessible to the processor 96 and include processor-executable instructions that, when executed, cause the processor 96 to execute a series of operations. With respect to first processor-executable instructions, the processor 96 is caused to establish a pairing between the proximate wireless-enabled interactive programmable device 48 and the thermostat 12. The processor-executable instructions then send user interface instructions relative to one of the amenities 30 to the proximate wireless-enabled interactive programmable device 48. The instructions may further cause the processor 96 to receive and process user input instructions relative to one of the amenities 30 from the proximate wireless-enabled interactive programmable device 48. The processor-executable instructions may also cause the processor 96 to generate a command signal and send the command signal to one of the amenities 30.

The memory 98 may also include second processor-executable instructions that, when executed, cause the processor 96 to receive and process the beacon signal 62 including the personal location device identification B. The instructions may then cause the processor 96 to generate the broadcast signal 64 including the personal location device identification B, the thermostat identification G, and the signal characteristics indicator S. Finally, the instructions may cause the processor 96 to send the broadcast signal to a server, such as the server 56.

The memory 98 may also include third processor-executable instructions that, when executed, cause the processor 96 to establish a pairing between the proximate wireless-enabled interactive programmable device 48 and the thermostat 12. Following the establishment of a pairing, the processor-executable instructions may cause the processor 96 to send user interface instructions relative to the amenity 30 to the proximate wireless-enabled interactive programmable device 48. The instructions may then cause the processor 96 to receive and process user input instructions relative to one of the amenities 30 from the proximate wireless-enabled interactive programmable device 48. As part of the status inquiry process, the processor-executable instructions may then generate a status inquiry, send the status inquiry to one of the amenities 30, receive a response to the status inquiry at the thermostat 12, and forward a status response to the proximate wireless-enabled interactive programmable device 48.

The memory 98 may include fourth processor-executable instructions that, when executed, cause the processor 96 to establish a pairing between the proximate wireless-enabled interactive programmable device 48 and the thermostat 12 and then send user interface instructions relative to one of the amenities 30 to the proximate wireless-enabled interactive programmable device 48. The processor-executable instructions may further cause the processor 96 to receive and process user input instructions relative to one of the amenities 30 from the proximate wireless-enabled interactive programmable device 48. Then, the processor 96 may be caused to import content from the proximate wireless-enabled interactive programmable device 48, reformat the imported content, and forward the reformatted imported content to one of the amenities 30.

Thus, the systems and methods disclosed herein may enable users to use existing electronic devices as a temporary remote control device to control various amenities. Therefore, the systems and methods presented herein avoid the need for additional or expensive high functionality remote controls. In this respect, the teachings presented herein also include providing the software and/or application for the electronic device or interactive handheld device. The application, to the extent needed, may be downloaded from the Internet or alternatively made available by download from a thermostat. Further, the systems and methods disclosed herein may enable users to be part of a geolocation and safety network.

Figure 5:
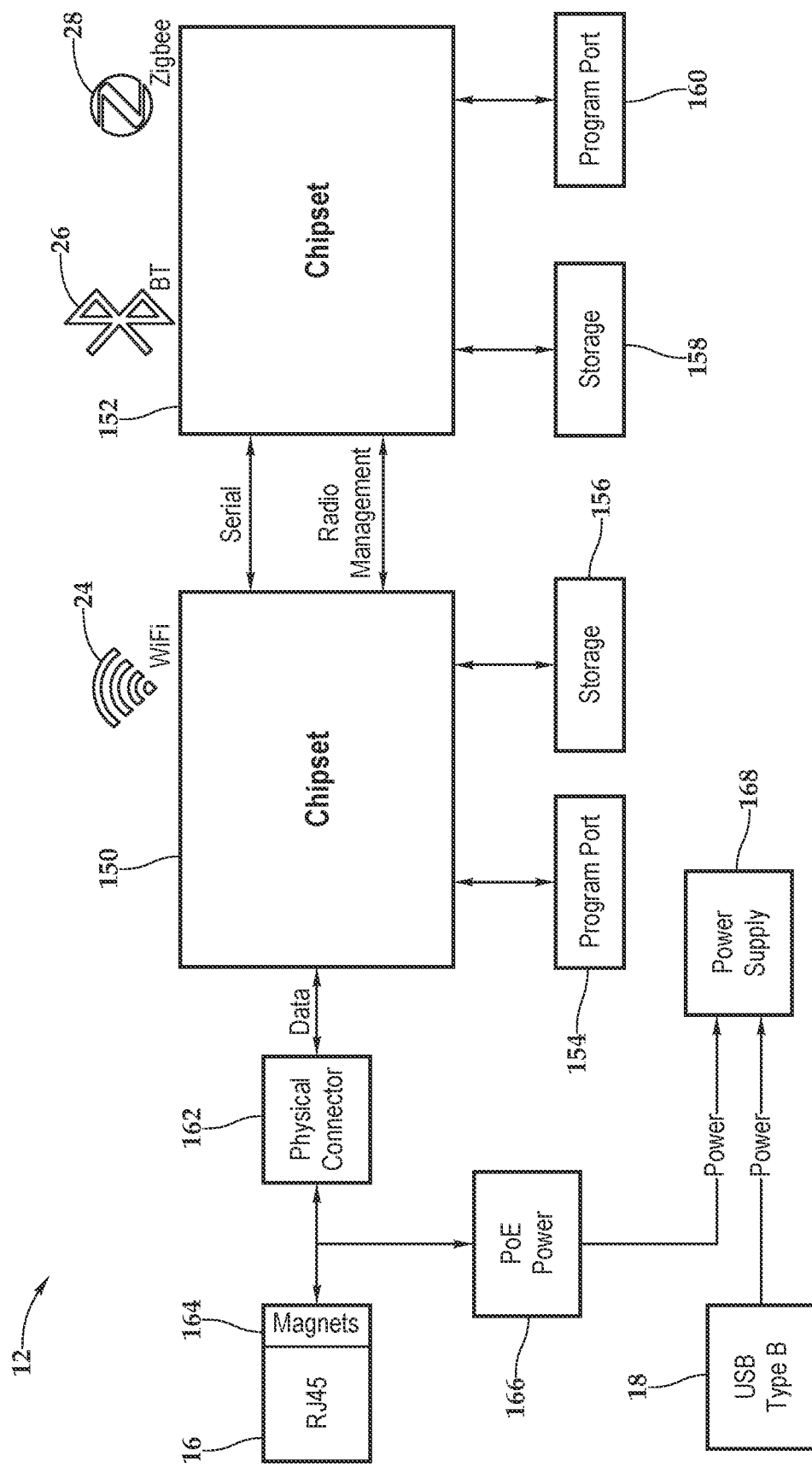
FIG. 5 is a functional block diagram depicting one operational embodiment of a portion of the thermostat shown in FIG. 4.

FIG. 5 depicts one embodiment of the thermostat 12. In this embodiment, chipsets 150, 152 respectively include a program port 154, storage 156 and storage 158 and a program port 160. The chipset 150 includes an antenna for wireless protocol Wi-Fi 24, while the chipset 152 includes antennas for wireless protocol Bluetooth 26 and wireless protocol ZigBee 28. Serial and radio management communications are enabled between the chipset 150 and the chipset 152. A physical connector 162 is connected to the chipset 150 to provide data thereto. The source of the data is the RJ45 port 16, which includes coupling magnet components 164. The RJ45 port 16 may also provide a power of Ethernet which is received by a power of Ethernet circuit component 166 and forwarded to a power supply 168. In the illustrated embodiment, the USB Type B port 18 may also provide power to the power supply 168.

Figure 6:
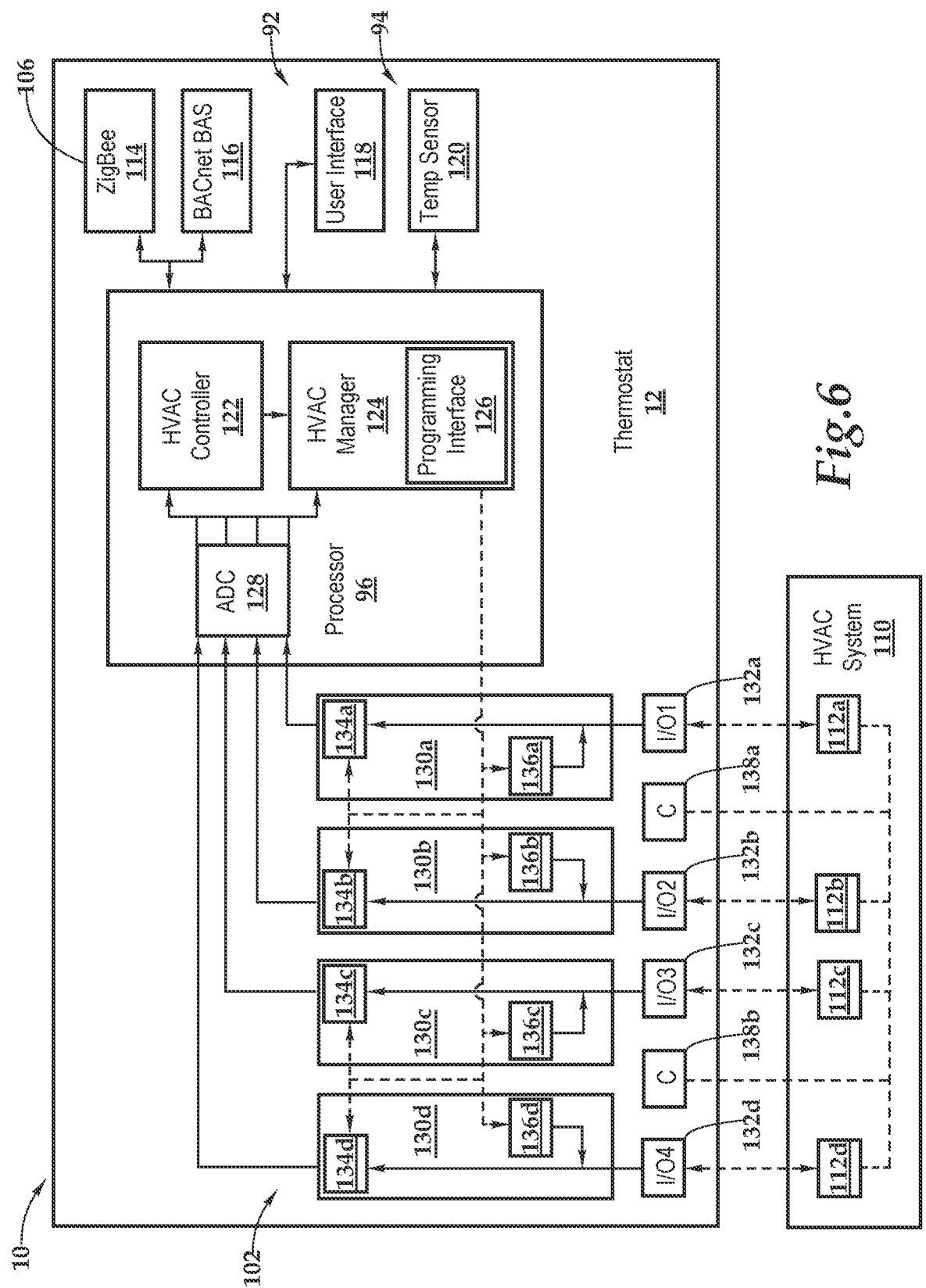
FIG. 6 is a functional block diagram depicting another operational embodiment of a portion of the thermostat shown in FIG. 4.

FIG. 6 depicts another operational embodiment of a portion of the thermostat 12 shown in FIG. 4. In this operational embodiment, the thermostat 12 is located in communication with an HVAC system 110, which may be servicing the space P and/or the hotel H, for example. The HVAC system 110 includes terminal connections 112a, 112b, 112c, and 112d providing an interface to various components of the HVAC system 110, including cooling, heating, humidity, and electronic air cleaning, for example. The terminal connections 112a, 112b, 112c, 112d are provided by way of nonlimiting example and it should be appreciated that the number and configuration of terminal connections may vary depending on the HVAC system 110 and application.

As shown, the thermostat circuitry 102 is interposed between the processor 96 and the HVAC system 110. The transceiver 106 communicates with the processor 96 and the transceiver 106 is depicted as a ZigBee antenna 114 in this embodiment. The inputs 92 and the outputs 94 to the thermostat 12 include a wired input/output device 116, a user interface 118, and a temperature sensor 120.

In the illustrated embodiment, the processor includes an HVAC controller 122, an HVAC manager 124 having a programming interface 126, and an analog-to-digital converter 128 (ADC). The thermostat circuitry 102 includes interface circuits 130a, 130b, 130c, 130d coupled to terminal interfaces 132a, 132b, 132c, 132d. Each of the interface circuits 130a, 130b, 130c, 130d have an amplification circuit 134a, 134b, 134c, 134d and an input/output circuit 136a, 136b, 136c, 136d.

The processor 96 may execute machine-readable instructions stored in memory on behalf of the thermostat 12. By way of example, the processor 96 may include a microprocessor having one or more cores, microcontroller, application-specific integrated circuit (ASIC), digital signal processor, digital logic devices configured to execute as a state machine, analog circuits configured to execute as a state machine, or a combination of the above, for example. The processor 96 stores instructions that may include at least one of HVAC controller logic embodied in the HVAC controller 122 and configurable input and output manager logic embodied in HVAC manager 124. In one embodiment, the HVAC manager may include a programming interface 120, which is configured to communicate with the thermostat 12 and provide process-executable instructions thereto by way of non-transitory memory accessible to the processor 96.

The HVAC controller 122 is configured to receive and store user selectable configuration parameters for configuring, via the HVAC manager 124, the terminal connections 112a, 112b, 112c, 112d of the HVAC system 110 as part of the monitoring and controlling of heating and cooling in a room or other environment to a setpoint temperature. The HVAC controller 122 communicates the various configuration parameters and setpoint temperature to the HVAC manager 124, which may also receive configuration parameters from the programming interface 126.

In the illustrated embodiment, the HVAC manager 124 generates and outputs a group of configuration control signals for each of the input/output circuits 136a, 136b, 136c, 136d and each associated amplification circuit 134a, 134b, 134c, 134d of the interface circuits 130a, 130b, 130c, 130d based on the parameters to communicate with the HVAC system 110. Once the terminal interfaces 132a, 132b, 132c, 132d have been configured for a respective input or output interface signal type by the interface circuits 130a, 130b, 130c, 130d, the amplification circuits 134a, 134b, 134c, 134d may employ one or more of the configuration control signals to scale and normalize the feedback signals from the respective terminal interfaces 132a, 132b, 132c, 132d to the interface circuits 130a, 130b, 130c, 130d, which, in turn, drive signals to the ADC 128, which, as mentioned, forms a portion of the processor 96. The ADC 128 converts the feedback signal to a multi-bit digital signal that be provided to or stored in memory associated with the processor 96 for access by both the HVAC controller 122 and the HVAC manager 124 for further processing. As shown in the implementation presented in FIG. 2, the thermostat 12 may also include one or more common, neutral return or earth ground terminals 138a and 138b for connecting to a respective common, neutral return or earth ground connection of the HVAC system 110, for example.

As mentioned hereinabove, in one implementation, the thermostat 12 includes the transceiver 106, shown as the ZigBee antenna 114. The thermostat 12 may also include the wired input/output device 116 that may employ a standard network communication protocol, such as BACnet™ or other network protocol, for enabling signal communication to and from the thermostat 12. The thermostat 12 may further include the user interface 118 coupled to the processor 96 via a standard bus or other bi-directional parallel or serial communication protocol connection. The user interface 118 may be a standard touch screen or combination of a keyboard and display, or other input/output device. When executing instructions provided by a user or programming software or firmware contained in a setup or configuration application, for example, the processor 96 may generate and display a screen via the user interface 118 that includes a user selectable settings input to enable a user, whether a guest, resident, technician, or thermostat installer, to identify system parameters to the processor 96 pertaining to the HVAC system 110. The temperature sensor 120 provides input regarding the temperature at or near the thermostat 12 within the space P, for example. It should be appreciated that although a particular thermostat architecture is presented in FIG. 6, other architectures are withing the teachings presented herein.

Figure 7:
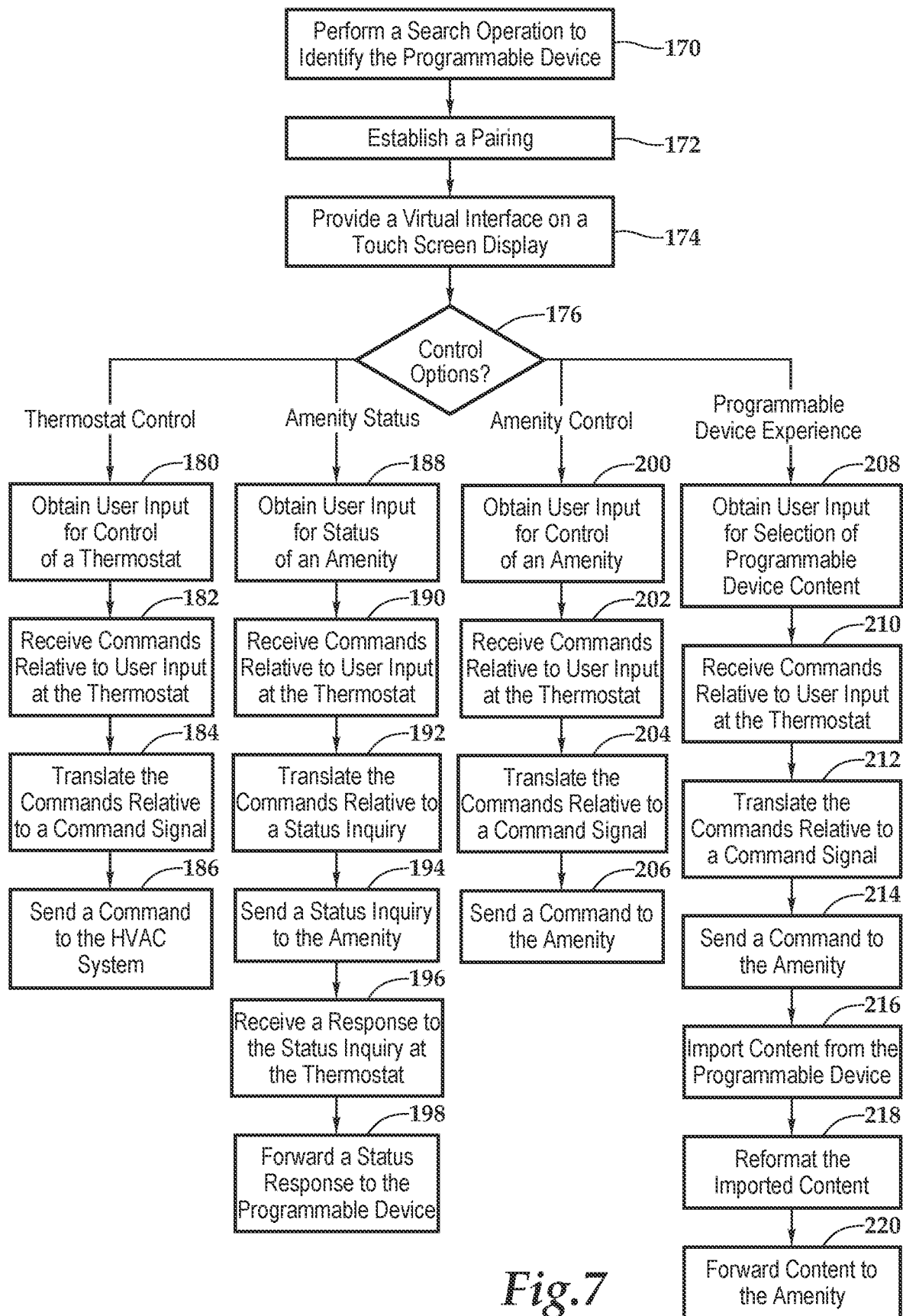
FIG. 7 is a flow chart depicting one embodiment of a method for providing a thermostat having enhanced convenience according to the teachings presented herein.

FIG. 7 depicts one embodiment of a method for providing convenience through a remote control device controlling amenities, according to the teachings presented herein. At block 170, a search, which may be active or passive, is performed by the thermostat to identify a physically proximate programmable device in the multi-room environment, for example. At block 172, a pairing is established. As noted by block 174, the pairing may provide an experience that includes providing a virtual interface with virtual buttons, for example. Referring to decision block 176, as previously discussed, the virtual remote controls and interface each correspond to amenities 30 under the control of the thermostat 12 and, as a result, in addition to monitoring and control of the thermostat 12, the status of the amenity may be determined, the amenity may be controlled, or a programmable device experience may be initiated.

With respect to thermostat control, at block 180, instructions are provided from the thermostat 12 for a virtual interface on a touch screen display associated with the proximate wireless-enabled interactive programmable device 48. In one embodiment, the virtual buttons are associated with the proximate wireless-enabled interactive programmable device 48 and relate to obtaining user input for the thermostat. At block 182, the thermostat 12 receives and processes control functionality input instructions from the proximate wireless-enabled interactive programmable device 48. At block 184, the commands are translated into a command signal. At block 186, the command signal is sent to the HVAC system.

With respect to amenity status, at block 188, instructions are provided to the proximate wireless-enabled interactive programmable device 48 to enable requests for the status of an amenity. At block 190, commands are received at the thermostat 12 relative to user input and a status inquiry. At block 192, the commands are translated and at block 194 a status inquiry is sent to the amenity. At block 196, a response to the status inquiry is received at the thermostat and forwarded to the proximate wireless-enabled interactive programmable device 48 at block 198.

With respect to control of amenities, at block 200, instructions are provided from the thermostat for a virtual interface on a touch screen display associated with the proximate wireless-enabled interactive programmable device 48. In one embodiment, the virtual buttons are associated with the proximate wireless-enabled interactive programmable device 48 and relate to obtaining user input for the amenity control functionality provided by the thermostat 12. At block 202, the thermostat receives and processes amenity control functionality input instructions from the proximate wireless-enabled interactive programmable device. At block 204, the commands are translated into a command signal. At block 206, the command signal is sent to the particular amenity.

Returning now to decision block 186 and the importation of content from the proximate wireless-enabled interactive programmable device 48, at block 208, instructions are provided from the thermostat 12 for an interface including virtual buttons, for example, on a touch screen display associated with the proximate wireless-enabled interactive programmable device 48. The virtual buttons may be associated with the proximate wireless-enabled interactive programmable device 48 and relate to obtaining user input for the programmable device experience functionality provided by the thermostat 12. At block 210, the thermostat receives and processes virtual remote control functionality input instructions from the proximate wireless-enabled interactive programmable device 48. At block 212, the commands are translated into a command signal and sent to the amenity at block 214. At block 216, content is imported from the proximate wireless-enabled interactive programmable device 48. At block 218, the imported content is reformatted for the targeted amenity and forwarded thereto at block 220. As discussed, the fully tuned signal including the imported content provides an upstream parallel experience on the television related to the content on the proximate wireless-enabled interactive programmable device 48.

Figure 8:
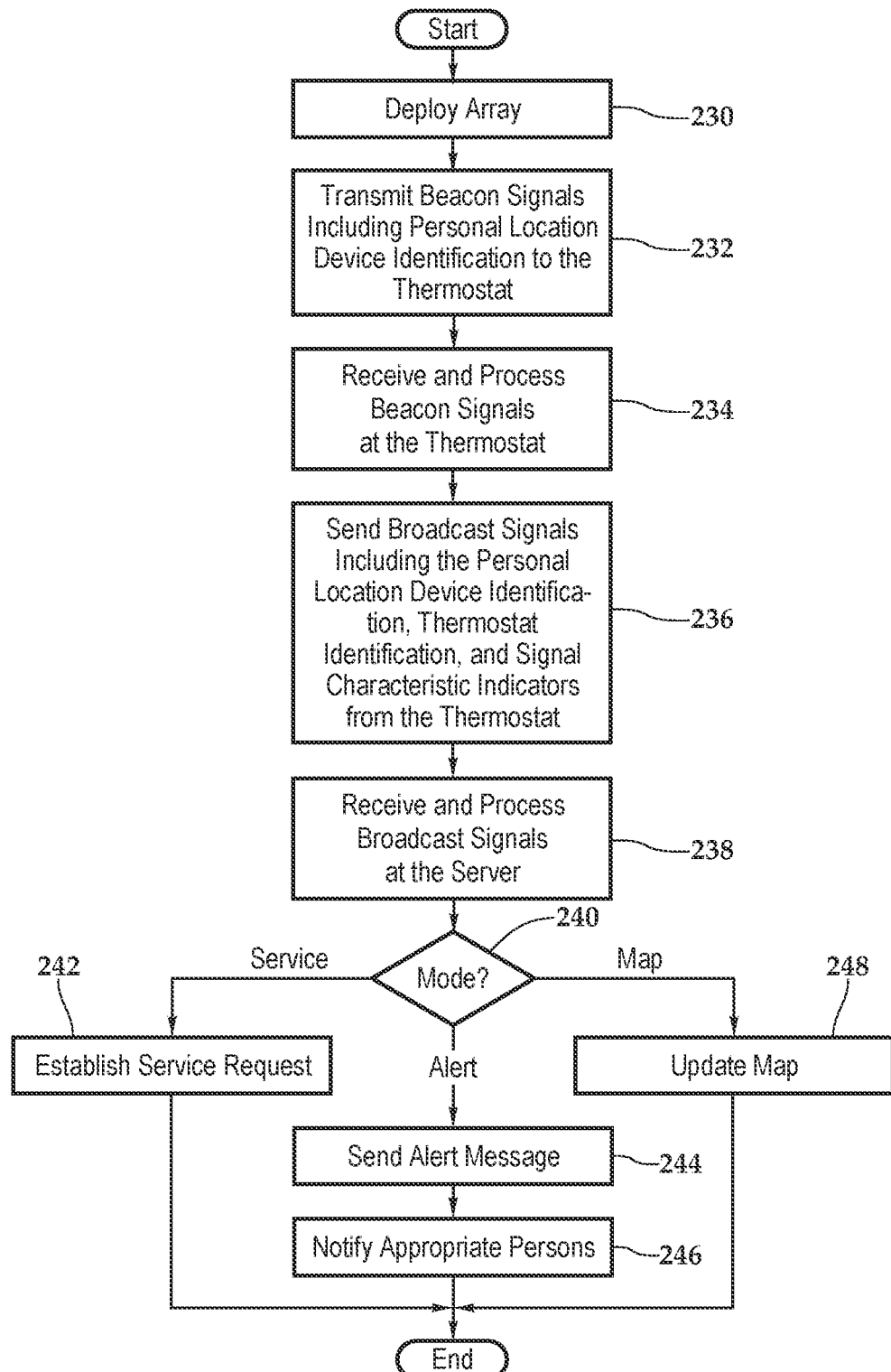
FIG. 8 is a flow chart depicting one embodiment of a method for providing a thermostat furnishing enhanced safety according to the teachings presented herein.

FIG. 8 depicts one embodiment of a method for providing safety in a hospitality environment or other environment, according to the teachings presented herein. At block 230, the array of thermostats is deployed vertically and horizontally throughout the hospitality environment. At block 232, beacon signals are periodically transmitted from personal location devices and received by the thermostats 12.

At block 234, the beacon signals are received and processed at the thermostat 12. The beacon signals may include a personal location device identification corresponding to the device being employed by the user. In one embodiment, signal strength between the beacon transmission of the set-top boxes and the common area beacons at the wireless-enabled interactive programmable device 48 is measured. In other embodiments, phase angle measurements or flight time measurements may be utilized. At block 236, broadcast signals are sent from the thermostats 12 to a server that is part of the geolocation and safety network 58. The broadcast signals may include the personal location device identification, thermostat identification, and signal characteristic indicators. At block 238, the server receives and processes the broadcast signals. At decision block 240, the server takes action based on the mode of operation. In a first mode of operation at block 242, a service request is associated with the location of the user utilizing the location of the personal location device such as the wireless-enabled interactive programmable device 48 as a proxy. In a second mode of operation at block 244, an emergency alert is sent and subsequent notification (block 246) occurs. The emergency alert includes an indication of distress and the location of the user utilizing the location of the wireless-enabled interactive programmable device 48 as a proxy. In a third mode of operation at block 248, the map of individuals is updated with the location of the user with, if privacy settings being enabled, the system maintains the privacy of the individual working in the hospitality environment such that the system only retains in memory the last known position and time of the user-supplied wireless-enabled smart and interactive handheld device. Further, in this mode of operation, the system does not reveal the location of the individual and programmable device unless and until an alert is issued.

The order of execution or performance of the methods and data flows illustrated and described herein is not essential, unless otherwise specified. That is, elements of the methods and data flows may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A system for remote control, the system comprising:
 a programming interface configured to communicate with a thermostat, the thermostat including a housing securing a temperature input, a temperature output, a processor, non-transitory memory, and storage therein, the thermostat including a busing architecture communicatively interconnecting the temperature input, the temperature output, the processor, the non-transitory memory, and the storage, the thermostat including a wireless transceiver associated with the housing and coupled to the busing architecture; and the non-transitory memory accessible to the processor, the non-transitory memory including first processor-executable instructions that, when executed by the processor, cause the system to:
  establish a pairing between a proximate wireless-enabled interactive programmable device and the thermostat,
  send user interface instructions relative to an amenity to the proximate wireless-enabled interactive programmable device,
  receive and process user input instructions relative to the amenity from the proximate wireless-enabled interactive programmable device,
  generate a command signal, and
  send the command signal to the amenity; and the non-transitory memory including second processor-executable instructions that, when executed by the processor, cause the system to:
  receive and process a beacon signal including a personal location device identification,
  generate a broadcast signal including the personal location device identification, a thermostat identification, and a signal characteristics indicator, and
  send the broadcast signal to a server.

2. The system as recited in claim 1, wherein the proximate wireless-enabled interactive programmable device comprises a device selected from the group consisting of personal computers, laptops, tablet computers, smart phones, and smart watches.

3. The system as recited in claim 1, wherein the personal location device identification is generated by a personal location device, the personal location device further comprising the proximate wireless-enabled interactive programmable device.

4. The system as recited in claim 1, wherein the personal location device identification is generated by a personal location device, the personal location device further comprising a single button personal location device.

5. The system as recited in claim 1, wherein the amenity is selected from the group consisting of television, lighting control, speakers, window shade control, and door security.

6. The system as recited in claim 1, wherein the signal characteristics indicator is based on the beacon signal being received at the thermostat.

7. The system as recited in claim 6, wherein the signal characteristics indicator is selected from the group consisting of signal strength measurements, phase angle measurements, and flight time measurements.

8. The system as recited in claim 1, wherein the non-transitory memory includes third processor-executable instructions that, when executed by the processor, cause the system to:
  establish the pairing between the proximate wireless-enabled interactive programmable device and the thermostat,
  send the user interface instructions relative to the amenity to the proximate wireless-enabled interactive programmable device,
  receive and process the user input instructions relative to the amenity from the proximate wireless-enabled interactive programmable device,
  generate a status inquiry,
  send the status inquiry to the amenity,
  receive a response to the status inquiry at the thermostat, and
  forward the response to the status inquiry to the proximate wireless-enabled interactive programmable device.

9. The system as recited in claim 1, wherein the memory includes fourth processor-executable instructions that, when executed, cause the processor to:
  establish the pairing between the proximate wireless-enabled interactive programmable device and the thermostat,
  send the user interface instructions relative to the amenity to the proximate wireless-enabled interactive programmable device,
  receive and process the user input instructions relative to the amenity from the proximate wireless-enabled interactive programmable device,
  import content from the proximate wireless-enabled interactive programmable device,
  reformat the imported content, and
  forward the reformatted imported content to the amenity.

10. A system for remote control, the system comprising:
  a programming interface configured to communicate with a thermostat, the thermostat including a housing securing a temperature input, a temperature output, a processor, non-transitory memory, and storage therein, the thermostat including a busing architecture communicatively interconnecting the temperature input, the temperature output, the processor, the non-transitory memory, and the storage, the thermostat including a wireless transceiver associated with the housing and coupled to the busing architecture; and
  the non-transitory memory including first processor-executable instructions that, when executed by the processor, cause the system to:
    receive and process a beacon signal including a personal location device identification,
    generate a broadcast signal including the personal location device identification, a thermostat identification, and a signal characteristics indicator, and
    send the broadcast signal to a server.

11. The system as recited in claim 10, wherein the personal location device identification is generated by a personal location device, the personal location device further comprising a proximate wireless-enabled interactive programmable device.

12. The system as recited in claim 10, wherein the personal location device identification is generated by a personal location device, the personal location device further comprising a single button personal location device.

13. The system as recited in claim 10, wherein the signal characteristics indicator is based on the beacon signal being received at the thermostat.

14. The system as recited in claim 10, wherein the signal characteristics indicator is selected from the group consisting of signal strength measurements, phase angle measurements, and flight time measurements.

15. The system as recited in claim 10, wherein the non-transitory memory includes second processor-executable instructions that, when executed by the processor, cause the system to:
  establish a pairing between a proximate wireless-enabled interactive programmable device and the thermostat,
  send user interface instructions relative to an amenity to the proximate wireless-enabled interactive programmable device, receive and process user input instructions relative to the amenity from the proximate wireless-enabled interactive programmable device, generate a status inquiry, and send the status inquiry to the amenity, receive a response to the status inquiry at the thermostat, and forward the response to the status inquiry to the proximate wireless-enabled interactive programmable device.

16. The system as recited in claim 15, wherein the proximate wireless-enabled interactive programmable device comprises a device selected from the group consisting of personal computers, laptops, tablet computers, smart phones, and smart watches.

17. The system as recited in claim 15, wherein the amenity is selected from the group consisting of television, lighting control, speakers, window shade control, and door security.

18. The system as recited in claim 10, wherein the non-transitory memory includes third processor-executable instructions that, when executed by the processor, cause the system to:

establish a pairing between a proximate wireless-enabled interactive programmable device and the thermostat, the proximate wireless-enabled interactive programmable device comprises a device selected from the group consisting of personal computers, laptops, tablet computers, smart phones, and smart watches, send user interface instructions relative to an amenity to the proximate wireless-enabled interactive programmable device, receive and process user input instructions relative to the amenity from the proximate wireless-enabled interactive programmable device, generate a command signal, and send the command signal to the amenity.

19. The system as recited in claim 18, wherein the amenity is selected from the group consisting of television, lighting control, speakers, window shade control, and door security.

20. A system for remote control, the system comprising:

a programming interface configured to communicate with a thermostat, the thermostat including a housing securing a temperature input, a temperature output, a processor, non-transitory memory, and storage therein, the thermostat including a busing architecture communicatively interconnecting the temperature input, the temperature output, the processor, the non-transitory memory, and the storage, the thermostat including a wireless transceiver associated with the housing and coupled to the busing architecture; and the non-transitory memory including first processor-executable instructions that, when executed by the processor, cause the system to:

establish a pairing between a proximate wireless-enabled interactive programmable device and the thermostat, receive and process a beacon signal including a personal location device identification, generate a broadcast signal including the personal location device identification, a thermostat identification, and a signal characteristics indicator, and send the broadcast signal to a server.

\* \* \* \* \*